United States Patent [19]

Larson et al.

[11] 4,418,382

[45] Nov. 29, 1983

[54] INFORMATION EXCHANGE PROCESSOR

[75] Inventors: Kenneth N. Larson, Thousand Oaks; John S. Davis, Glendale, both of Calif.; Lewis M. Bostick, Honolulu, Hi.

[73] Assignee: Allied Corporation, Morris Township, Morris County, N.J.

[21] Appl. No.: 147,252

[22] Filed: May 6, 1980

[51] Int. Cl.³ .............................................. G06F 1/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,001,783 | 1/1977 | Monahan et al. | 364/200 |
| 4,006,466 | 2/1977 | Patterson et al. | 364/200 |
| 4,016,548 | 4/1977 | Law et al. | 364/200 |
| 4,074,352 | 2/1978 | Cook et al. | 364/200 |
| 4,110,823 | 8/1978 | Cronshaw et al. | 364/200 |
| 4,149,242 | 4/1979 | Pirz | 364/200 |
| 4,181,936 | 1/1980 | Kober | 364/200 |

Primary Examiner—James D. Thomas
Assistant Examiner—David Y. Eng
Attorney, Agent, or Firm—Joel Rosenblatt

[57] ABSTRACT

An information exchange processor suitable for coupling a plurality of host computers to a plurality of communication channels each of which may utilize a uniquely defined communication discipline. More specifically, the information exchange processor comprises a master bus, one or more host memory input/output units each serving a different host computer, one or more microprocessors, one or more memory devices, and a plurality of device input/output units each of which serves one or more communication channels. Each communication channel can serve a peripheral device having a different communication discipline. In addition, the information exchange processor disclosed also provides a capability for interconnecting two communication channels having either the same or different communication disciplines for effecting direct information transfers therebetween without requiring monitoring by a host computer.

8 Claims, 20 Drawing Figures

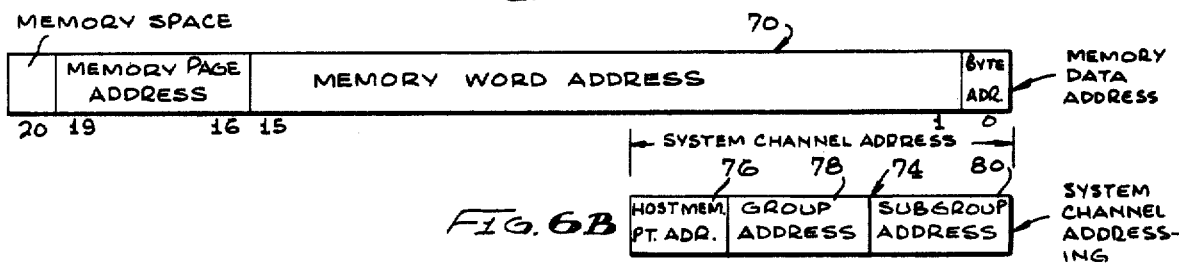
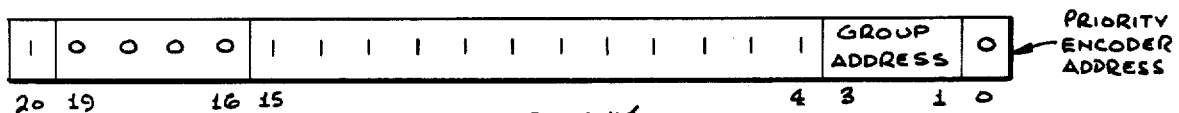
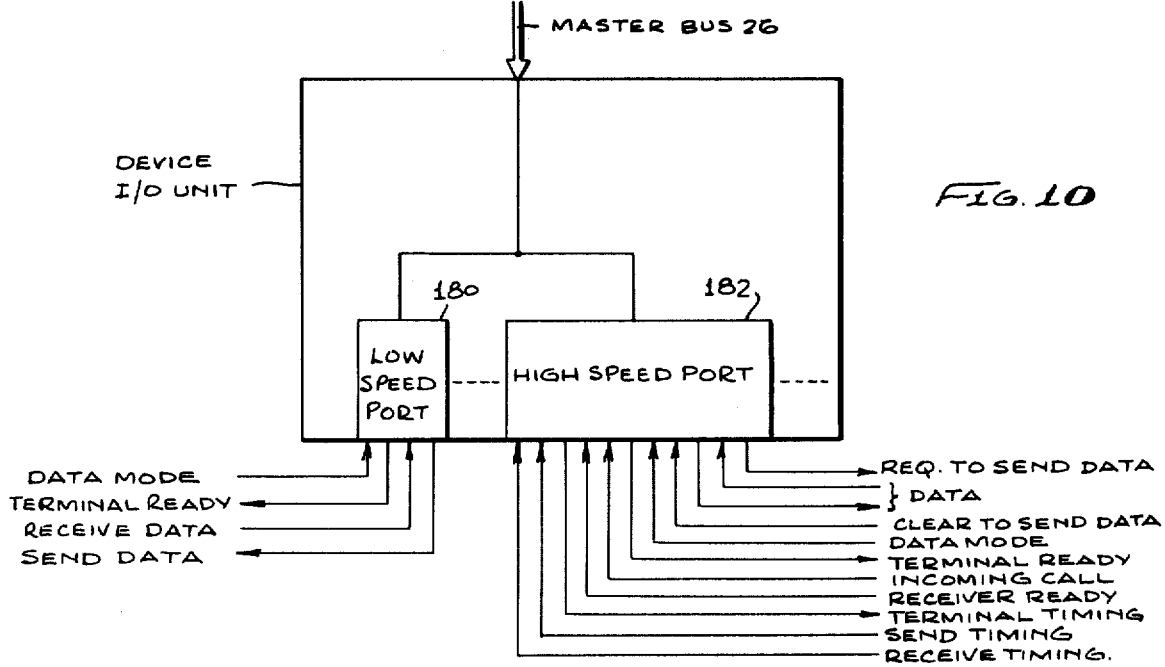

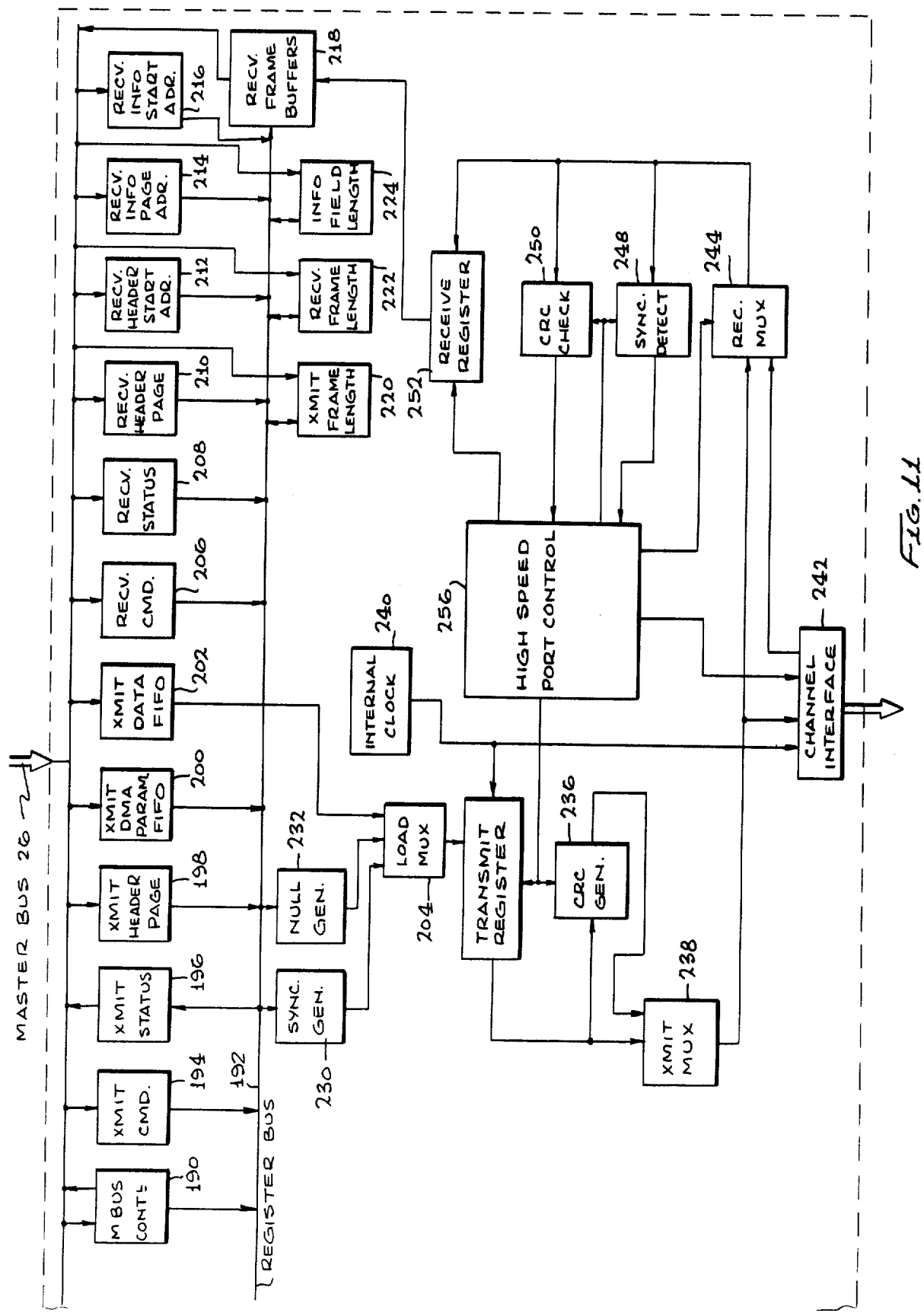

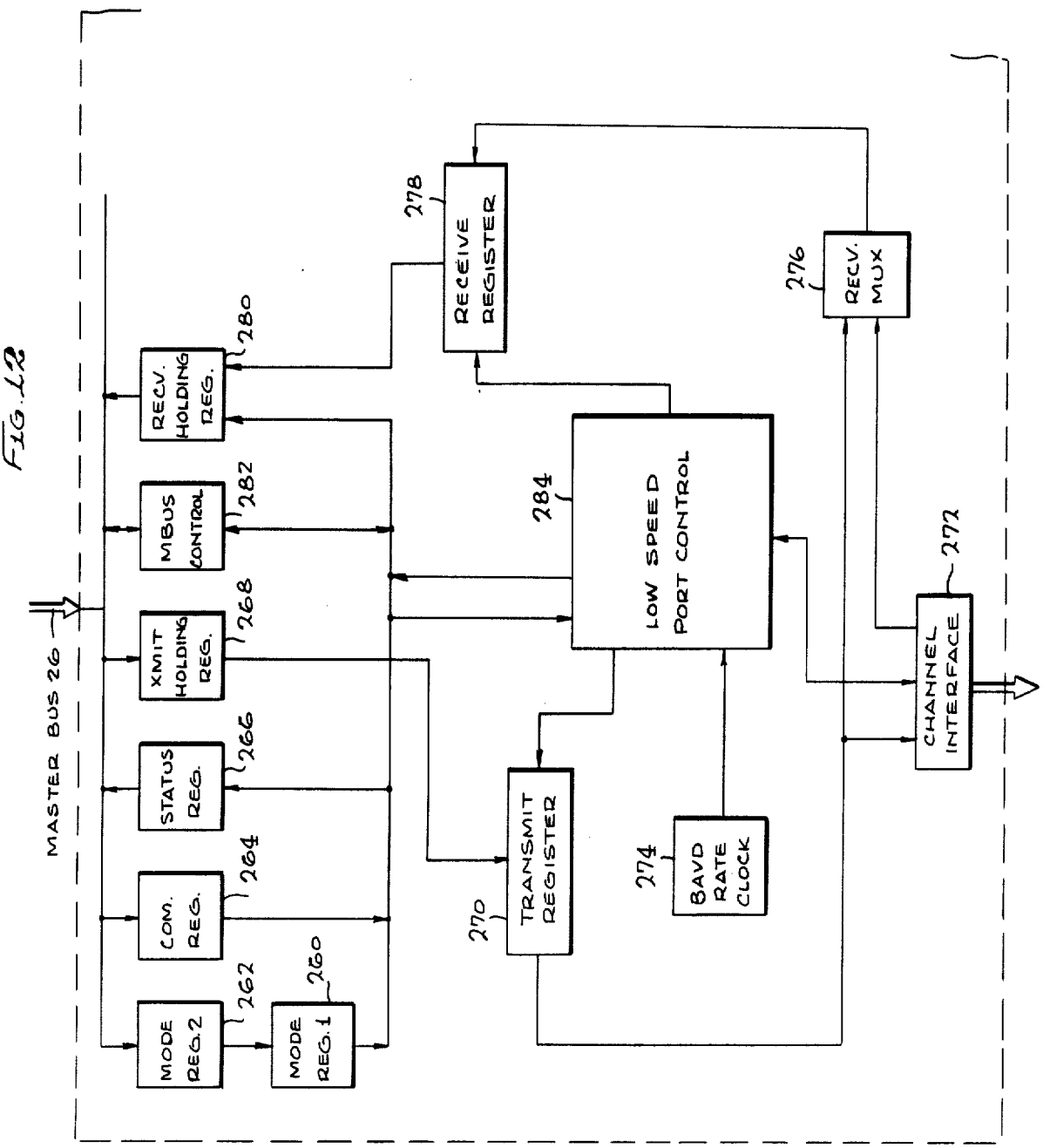

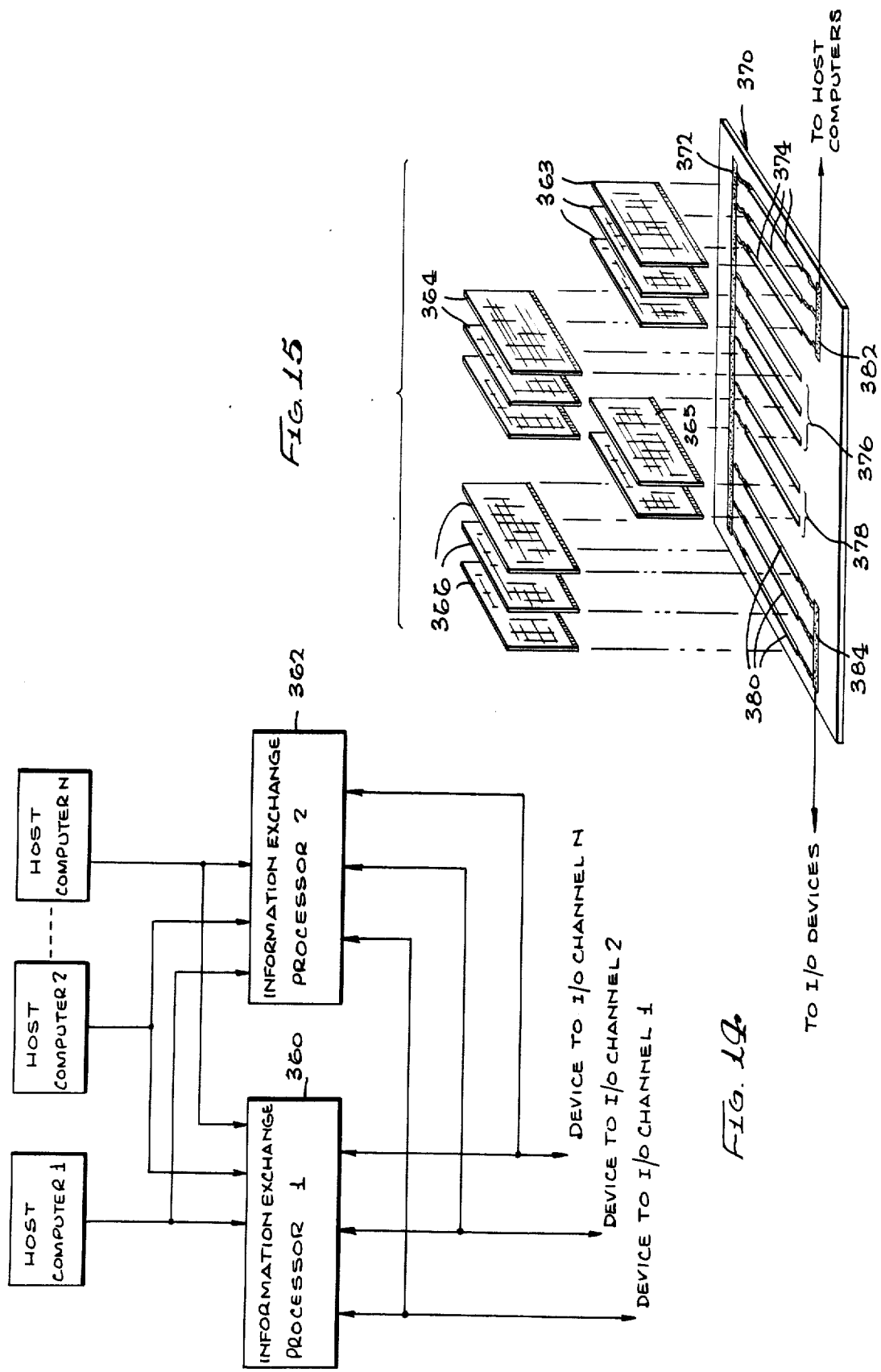

INFORMATION EXCHANGE PROCESSOR

BACKGROUND OF THE INVENTION

The invention relates generally to digital computer data management systems, and more particularly to a system for controlling interfaces between a plurality of computers and a plurality of peripheral devices and communication circuits which may employ different communication disciplines.

The term "communication (or line) discipline" may be defined as a set of rules or criteria governing the transfer of data to or from a particular peripheral device. Exemplary factors distinguishing one discipline from another involve, for example, data format, control signal sequence synchronization, start and end of message sequences, message signal lengths, etc. Many different communication disciplines have evolved which are now well known to those skilled in the art. The following list comprises only a small portion of those disciplines which might be of interest in a typical on-line data management system:

| | | |
|---|---|---|
| (1) | VIP | Visual Image Projection Terminal (Honeywell) |
| (2) | DN355 | Datanet 355 (Honeywell) |
| (3) | Baudot TTY | ITA Number Two Teletypewriter |
| (4) | ASCII TTY | ASCII Teletypewriter-Odd or Even Parity |
| (5) | BISYC | Point-to-Point Binary Synchronous Communications |

Due to a lack of standardization of the various communication disciplines, it is generally necessary for a system to include separate communication and input/output controllers to accommodate each different discipline to be handled by the system. In some data management applications, it is not unusual for a system to have to accommodate six or more types of major network disciplines plus a multitude of other disciplines for specialized terminals and peripheral devices. To aggravate the problem further, new disciplines are continually being developed which, in turn, require that new controllers be designed if an existing capability is to be expanded to accommodate the new discipline.

Systems for facilitating effective communication between multiple peripheral devices employing different communication disciplines and the main memory of a controlling computer are described in U.S. Pat. No. 4,075,691 to J. S. Davis et al and U.S. Pat. No. 4,079,452 to K. N. Larson et al.

SUMMARY OF THE INVENTION

The present invention is directed to an information exchange processor useful in a data processing system having one or more host computers, each host computer having a central processing unit and an associated main memory, and a plurality of peripheral devices, each of the peripheral devices intended to communicate with one or more host computers or with one or more other peripheral devices, the peripheral devices including local or remote data storage devices, data input/output devices, or communication networks. The information exchange processor responds to an input message from each host computer or each peripheral device via a shared or individual channel in accordance with a communication discipline defined for that channel, and supplies a corresponding output message to one of the host computers or one of the peripheral devices on that or another channel in accordance with a communication discipline defined for that channel.

In an exemplary embodiment, the information exchange processor includes a master bus; at least one host memory input/output unit coupled to the master bus for receiving data from or transmitting data to a host computer via a host computer input/output channel; a plurality of device input/output units coupled to the master bus, each for receiving data from or transmitting data to the peripheral devices via a device input/output channel; and a control means coupled to the master bus and responsive to data supplied from any of the host memory input/output units or device input/output units for providing data to any of the channels in accordance with a communication discipline defined for that channel.

In accordance with a significant feature of the exemplary embodiment, each microprocessor is dedicated to and controls a predetermined set of device input/output channels but all of the microprocessors are responsive to requests from each of the host memory input/output units. In accordance with a further feature of the exemplary embodiment, an addressing structure is provided which enables each host memory input/output unit to address any device input/output channel without regard to which particular microprocessor controls that channel. In accordance with a still further feature, the addressing structure enables the number of microprocessors to be increased to thus enhance system throughput without necessitating modification of the device input/output units or the host memory input/output units.

In addition, one or more auxiliary memories are connected to the master bus which can be accessed by the microprocessors, host memory input/output units and device input/output units, for data and the like not contained in the microprocessor-associated local memories. The exemplary embodiment provides for memory partitioning so that much of the calculations associated with control of the information channels and their associated peripheral devices by the microprocessor can be performed without access to the master bus, thereby increasing efficiency due to less waiting for transfer of information along the bus.

A unique feature of the invention involves a partitioning of both memory and hardware registers within the information exchange processor which completely masks characteristics of a host computer from a peripheral device, thereby allowing any host computer to send information to and receive information from any peripheral device.

In accordance with a further embodiment, two information exchange processors are connected in parallel to the same plurality of host computers and device input/output channels. Thus, a failure in one information exchange processor would result in the other information exchange processor to immediately assume the entire load without having to overburden any of the host computers.

BRIEF DESCRIPTION OF THE DRAWINGS

FIGS. 6A through 6F are diagrammatic representations of various address words utilized by the information exchange processor;

FIG. 10 is a block diagram of a device input/output unit showing low and high speed input/output ports;

FIG. 11 is a block diagram of the high speed port shown in FIG. 10;

FIG. 12 is a block diagram of the low speed port shown in FIG. 10;

FIG. 14 is a block diagram showing two information exchange processors connected in parallel between a plurality of host computeers and a plurality of device input/output channels; and FIG. 15 is an exploded view showing a physical configuration of an information exchange processor.

DETAILED DESCRIPTION

Detailed illustrated embodiments of the invention disclosed herein exemplify the invention and are currently considered to be the best embodiments for such purposes. They are provided by way of illustration and not limitation of the invention. Various modifications thereof will occur to those skilled in the art, and such modification are within the scope of the claims which define the present invention.

As previously explained, an informatiom exchange processor is disclosed which interfaces a plurality of input/output devices to each other, the devices including at least one host computer, and a variety of peripheral devices such as communication networks, data input/output devices, remote data terminals including CRT terminals. The peripheral devices could also include other information exchange processors. A host computer, for example, can establish through the information exchange processor a communication link between two peripheral devices each utilizing a different communication discipline. It is not necessary for the host computer to monitor the information exchanged, and once having established a link, can be off-line with respect to that information exchange. The information exchange processor includes a master bus to which are connected a plurality of host memory input/output units each of which is connected to an associated host computer; a plurality of device input/output units, a plurality of microprocessors for controlling the transfer of information from one host memory input/output unit to another host memory or device input/output unit, or from one device input/output unit to another device input/output unit, or host memory input/output unit; and an auxiliary memory which can be accessed by the microprocessors, host memory input/output units and device input/output units. Thus, the information exchange processor disclosed provides a means for directly accessing a plurality of host computers for transferring data to and receiving data from a plurality of information channels.

Figure 1:
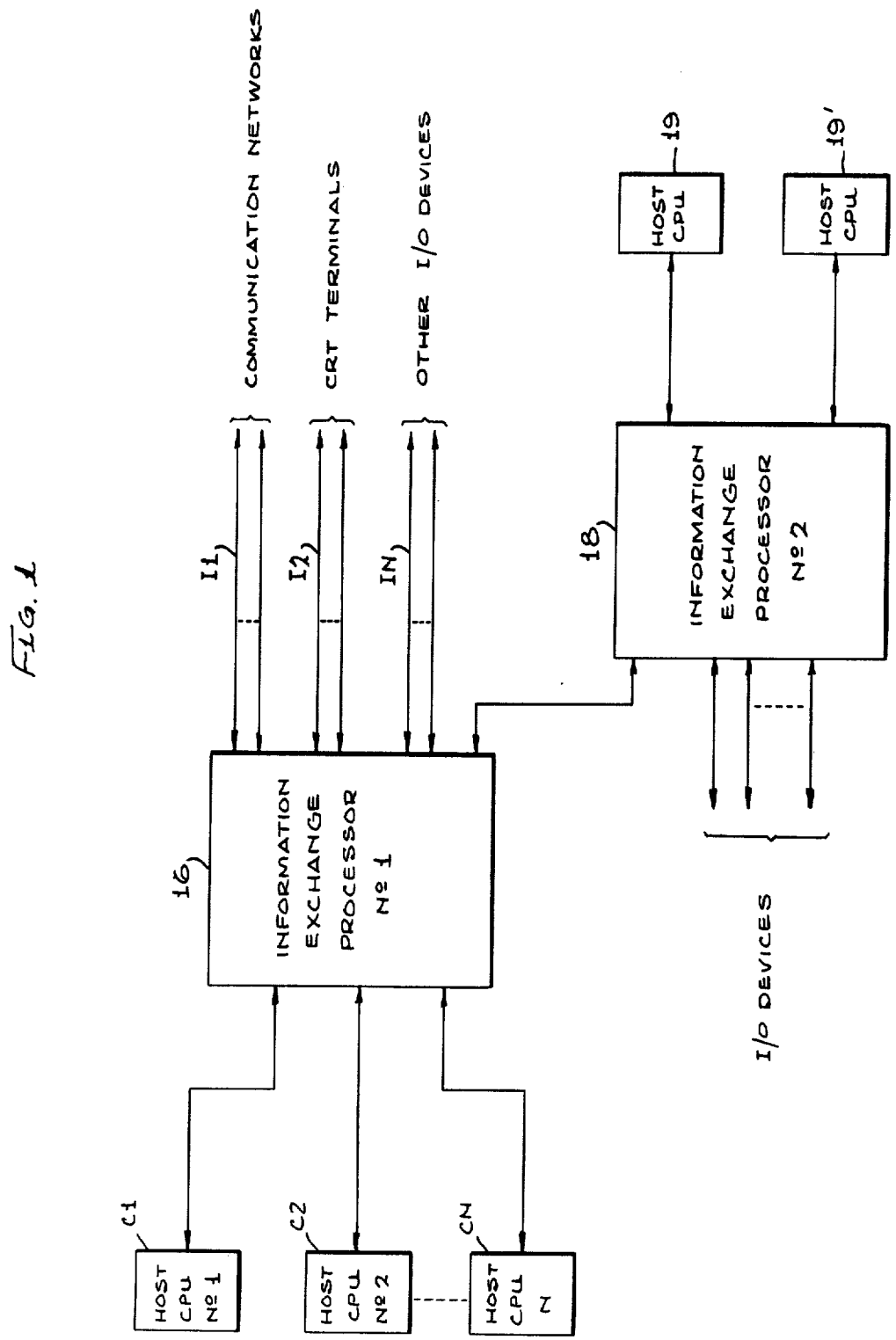
FIG. 1 is a block diagram showing interfaces between an information exchange processor provided by the invention and various host computers, peripheral devices, and another information exchange processor.

Referring now to FIG. 1, a first information exchange processor 16 is used to interface a plurality of host computers or central processing units (CPU's) C1–CN to a plurality of device input/output channels I1–IN, or to a second information exchange processor 18 which in turn provides an interface between other host computers 19 and 19' and other input/output devices. The information exchange processor 16 is configured as will be explained below so that peripheral devices connected to the various device input/output channels I1–IN can be interconnected and pass information back and fourth without tying up or otherwise utilizing one of the host computers C1–CN, thereby freeing that host computer for other tasks. The peripheral devices which can be serviced by the information exchange processor 16 are many and varied, and include as previously explained, other information exchange processors, CRT terminals, card readers, card punches, tape cassettes, tape cartridges, magnetic tape reels, disc storage devices, and the like. Also, as will be explained below, the information exchange processor is configured so that once a host computer requests a data transfer be made to or from a specific device input/output channel, whatever data formatting, reformatting, deformatting, error recovery and control functions are necessary to accomplish the requested transfer will be automatically effected within the information exchange processor, and the host computer need not be involved again until the transfer is complete. Thus, the information exchange processor provided by the invention allows device input/output channels requiring different communication disciplines to be directly interconnected due to the reformatting capability within the information exchange processor.

Figure 2:
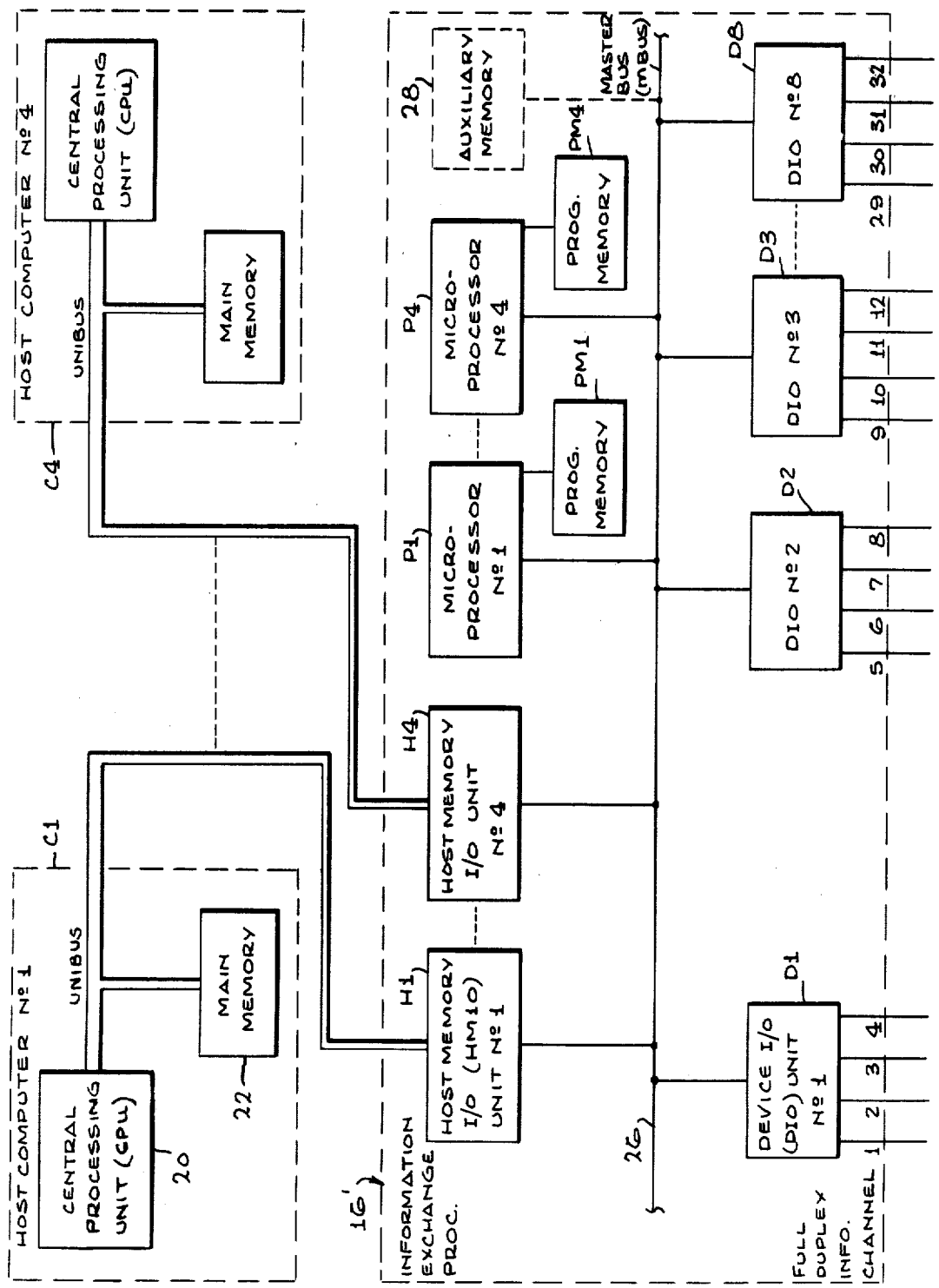
FIG. 2 is a block diagram showing an information exchange processor and its associated host memory input/output units, microprocessors, master bus and device input/output units.

An information exchange processor 16', as shown in FIG. 2, is configured to interface four host computers C1–C4 to thirty two full duplex device input/output or information channels. The first host computer C1 includes a central processing unit (CPU) 20 and an associated main memory 22. Although in this exemplary embodiment four host computers C1–C4 are utilized, the number of host computers could be either more or less than the four shown. A typical host computer could be a PDP-11 computer manufactured by Digital Equipment Corporation, Maynard, Mass. A PDP-11 computer shown in FIG. 2 includes a data bus (UNIBUS) which provides an interface to the central processing unit 20 and the main memory 22. Four host memory input/output units H1–H4 are provided in the information exchange processor 16', each unit providing an interface between an information exchange processor master bus (MBUS) 26 and its associated host computer. Thus, host computer C1 is connected to the master bus 26 via the first host memory input/output unit H1. Each host memory input/output unit can effect direct memory access to the main memory of its associated host computer and can store parameters for any of the thirty two full duplex device input/output channels. In addition, as will be explained below, through other controls any of the device input/output channels can be directly connected to another device input/outtput channels for two-way transfer of information.

Four microprocessors P1-P4 are also provided, each microprocessor having a priority interrupt structure and a capability for addressing over a half-million sixteen-bit words. Each microprocessor has an associated program memory PM1-PM4 to which it is connected for direct memory access without utilizing the master bus 26. The architecture of each microprocessor is designed to facilitate bookeeping required to control multiple channels and to minimize overhead time for servicing of each channel. As will be explained below, up to 8192 words are contained in an on-board memory associated with each microprocessor, and 57,344 words are contained in its associated program memory. Thus, control programs can be stored in each microprocessor memory, thereby reducing traffic on the master bus 26 to only data and control word transfers. Although four microprocessors P1-P4 are shown, the number of microprocessors could be reduced or increased in accordance with the number of host computers and the number of device input/output channels to be serviced.

A plurality of device input/output units D1-D8 are provided, each controlling four full duplex information channels, each channel being capable of driving one or more peripheral devices (not shown). The device input/output units D1-D8 are connected to the master bus 26. In addition, a data or auxiliary memory 28 is also connected to the master bus 26, this memory 28 being used by each microprocessor, host memory input/output unit, or device input/output unit for storing information useful to data transfer through the information exchange processor. The program memories PM1-PM4 associated with each microprocessor may be accessed by other microprocessors, host memory input/output units, or device input/output units via the master bus 26. For the exemplary embodiment shown, four host memory input/output units are provided, thereby allowing the information exchange processor 16' to simultaneously communicate with four host computers C1-C4. Transfers to and from each host computer are controlled by the information exchange processor on a time shared basis without assistance from the host computers.

The information exchange processor disclosed utilizes a unique addressing structure that provides for connecting any host computer to any input/output or information channel. In addition the addressing structure allows the number of host computers, device input/output units and microprocessors to be altered without changing any of the programming within each microprocessor. As will be further explained below, the host memory input/output unit is configured on a single card which can be plugged into the master bus. The microprocessor and device input/output units are similarly configured.

Figure 3:
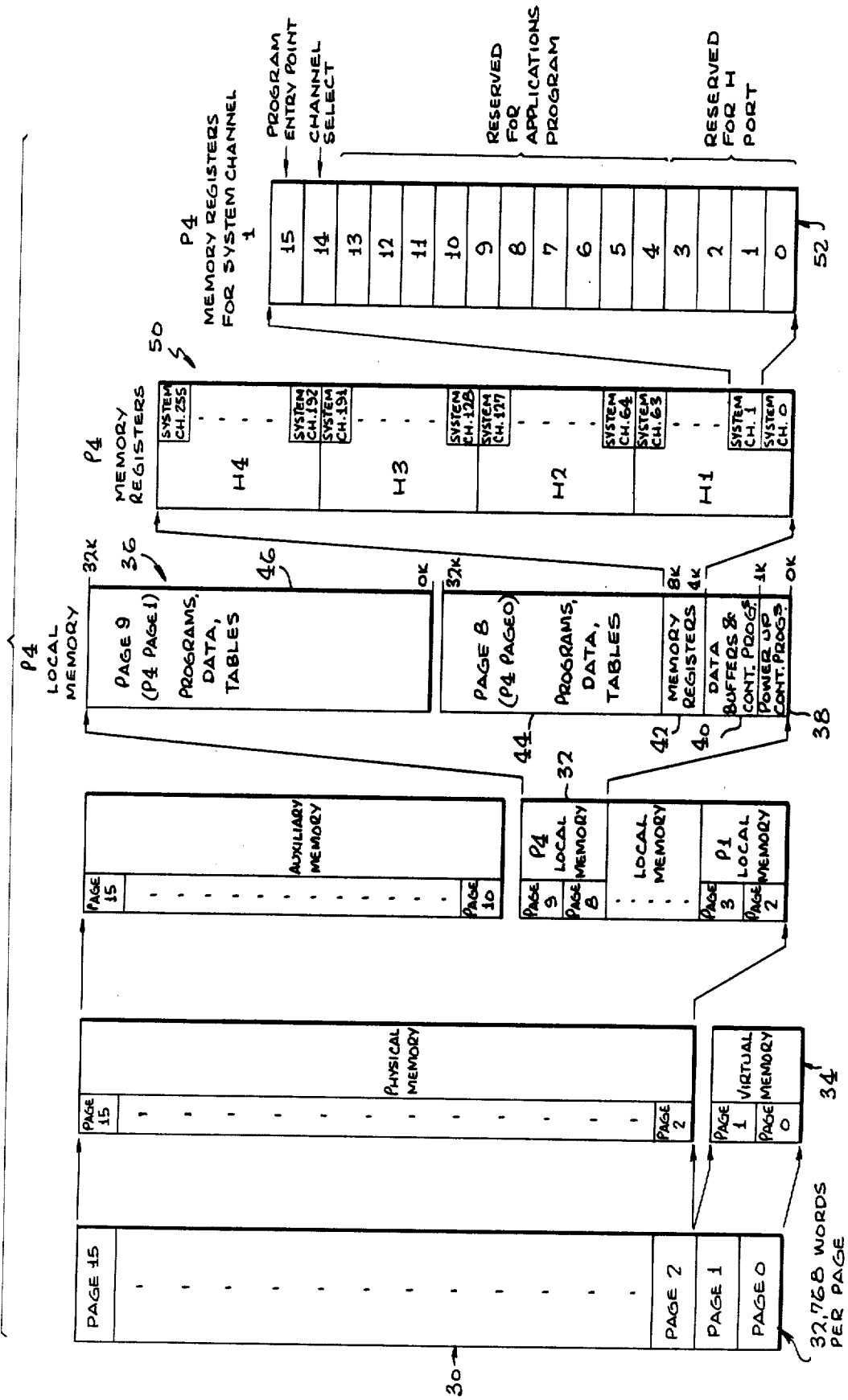
FIG. 3 is a diagrammatic representation of memory allocation within the information exchange processor.

Memory address partitioning within the microprocessors P1-P4 and the auxiliary or data memory 28 is shown in FIG. 3. However, it should be recognized by those familiar with the information processing art that partitioning can be effected in many different ways. In the exemplary embodiment, a total of 524,288 memory words may be directly addressed through the master bus 26. The 524,288 words are organized into sixteen pages of 32,768 words each. A maximum of 458,752 words (fourteen pages) of physical memory can be installed in this space beginning on page two as shown at 30. Eight pages of physical memory are distributed to the four microprocessors, each microprocessor being assigned two pages as its local memory. The remaining six pages of memory are assigned to the auxiliary memory 28. For example, the local memory for the fourth microprocessor P4 is shown at 32, and consists of pages eight and nine of the total physical memory. The assignment of physical memory is made via ID numbers which uniquely identify a particular microprocessor and the device input/output units that it will service. Thus, all information channels connected to a particular device input/output unit are serviced by the same microprocessor. The ID number is loaded into each microprocessor during an initialization sequence to be explained below. As an alternate to utilizing computer generated ID numbers, a rotary switch can be provided on each microprocessor for indicating its two pages of physical memory and the information channels that it will service. Local memory 32 is non-overlapping, that is, each microprocessor is assigned a unique set of two pages for its local memory. All physical memory is global so that any device through the master bus 26 may access a specific microprocessor's local memory. That means that one microprocessor may access the local memory of another microprocessor if required. The significance of local memory is that a microprocessor may access its own local memory without going onto the master bus 26. By having a direct connection to its local memory, a microprocessor avoids the delays associated with cotending for use of the master bus 26 and adhering to bus timing constraints. Thus, the accesses that a microprocessor makes to its local memory are performed very fast relative to accesses which it makes to memory located elsewhere in the information exchange processor 16'. In addition to speeding up its own operation, a microprocessor also reduces traffic on the master bus 26 and minimizes its interference with other microprocessors operating within the information exchange processor by making direct accesses to its own local memory. For these reasons, a microprocessor is chosen and configured to execute its program code and maintain control programs in its local memory.

A unique feature of the addressing structure disclosed is that each microprocessor addresses its own local memory as if that memory were located in pages zero and one, which, as previously explained, do not correspond to physical memory locations. This convention allows identical program codes to be loaded into the local memories of each of the four microprocessors. Each microprocessor may then execute that code out of its own local memory within interferring with the other microprocessors which are executing the same code and utilizing the same addresses. Since each of the microprocessors internally addresses its own local memory as pages zero and one, it is not practical to locate any physical memory in those pages. Thus, pages zero and one are identified as virtual memory as shown at 34 in FIG. 3.

The first 8192 words of a microprocessor's local memory 32 are contained within the microprocessor itself and are designated as on-board memory. The remaining words are located in its associated program memory as shown in FIG. 2. Referring again to FIG. 3, the local memory for the fourth microprocessor P4 is shown at 36, the organization of this memory being the same that for the first three microprocessors P1-P3. The first page consists of power up control programs 38, data buffers and control programs 40, and memory registers 42. The rest of page zero of local memory is utilized for various programs and data table information as shown at 44. All of page one of local memory is taken up with similar types of information as shown at 46. The second 4096 words of page zero memory 42 contains system channel memory registers for each of the full duplex input/output channels, and each of the host memory input/output devices. This is shown in detail at 50 and includes 256 system channels, 256 being the thirty two full duplex lines multiplied by two then multiplied by four to accommodate the four host computers C1-C4.

The system channels are divided so that each microprocessor local memory 32 has a specific memory register associated with each possible host computer/information channel combination. Thus, the first sixty four memory channels are assigned to the first host computer H1, each of the sixty four channels corresponding to one of the information channels. The second host computer H4 is assigned to channels sixty four through one hundred twenty seven, each of these sixty four channels also corresponding to one of the information channels. Information channels are similarly allocated to the third and fourth host computers H3 and H4 respectively. During the initialization process as previously described, each microprocessor is assigned information channels that it will control. Thus, the first microprocessor P1 could be assigned information channels 1-16, the second channels 17-32, the third channels 33-48, and the fourth channel 49-64. Any request for access to or from a specific information channel will then be serviced by a predetermined microprocessor. Thus, a given microprocessor only sees the memory registers containing those system channels assigned to it.

Each of the 256 system channels is assigned sixteen sixteen-bit words defined in FIG. 3 at 52. This second 4096 words of memory 42 is physically distributed to each of the four microprocessors P1-P4, each microprocessor containing that portion of the memory which corresponds to those system channels assigned to it during initiation. This second 4096 words of page zero appears to exist to the host memory input/output units and the device input/output units connected to the master bus 26 in that they may read and write data to and from this area of page zero. The remaining memory in page zero and all of page one appears as nonexistent memory to units connected to the master bus 26 in that data cannot be read from or written into these areas, this memory being used for internal control purposes according to a specific application. An example of such an application would be use of the microprocessor to interface two duplex information channels each of which operates peripheral equipment having different communication disciplines.

As previously explained, in the exemplary embodiment described herein memory pages two and three, four and five, six and seven, and eight and nine are local memory pages assigned to microprocessors P1-P4, respectively. A microprocessor may access its local memory without going onto the master bus 26. Other microprocessors may also access a given microprocessor's local memory through the master bus. The first 8192 words of local memory are contained within each microprocessor and are designated as an on-board memory. The on-board memory partitions 38, 40 and 42 are chosen as previously described, however, other partitioning schemes could be utilized. As can be seen, portions of the channel memory registers shown in page zero to be controlled by each microprocessor are stored in the on-board memory as shown at 42. The remainder of the on-board memory is assigned to application programs, data tables, microprocessor channel/control tables, and microprocessor control/boot programs. The microprocessor control/boot programs utilize the first 1024 words of on-board memory as shown at 38. This portion of the memory page consists of read-only memory and cannot be written into.

The upper 7168 words of the on-board memory may be all read/write memory or a combination of read/write and read-only memory. If a combination memory is chosen, programs will be stored in the read-only portion, while memory registers and data tables are stored in the read/write portion of the memory. As previously explained, since each microprocessor addresses its local memory as if it were actually in pages zero and one, the internal mapping to pages zero and one allows an identical set of controls and application programs to be loaded into each of the four microprocessors P1-P4. Providing each microprocessor with its own copy of common programs considerably increases throughput by eliminating time consuming memory contention cycles which would otherwise occur if common programs were stored in a common memory. Most of memory page zero and all of memory page one usually are not accessed from the master bus because all of the microprocessors are internally executing their programs in this memory space. The one exception is access to the memory registers 42. Access to these registers is made through page zero so that the host memory input/output units and device input/output units would not need to know which channels are assigned to which microprocessor. When a channel memory register is addressed on page zero, only that microprocessor assigned to the channel containing the memory register will respond.

Each microprocessor P1-P4 is capable of addressing any accessible master bus 26 memory location. As a result, data tables stored in the local memory of one microprocessor can be accessed by a second microprocessor and visa-versa, thereby providing a mechanism for inter-microprocessor communication. Sharing of application programs, while possible, is usually not done because any two microprocessors contending for access to the same area of a program memory slow down the information exchange processor throughput considerably.

The sixteen memory registers 52 assigned to each channel are as follows. The first four of the memory registers as shown at 54 are reserved as mail boxes for communicating with each of the host memory input/output units. The top two memory registers, that is registers fourteen and fifteen contain the channel select register value and the program entry point for that system channel. These two words are used by the microprocessor to service an interrupt occuring on that channel. The remaining memory registers assigned to a system channel are reserved for use by the microprocessor while executing that channel's application program.

Figure 4:
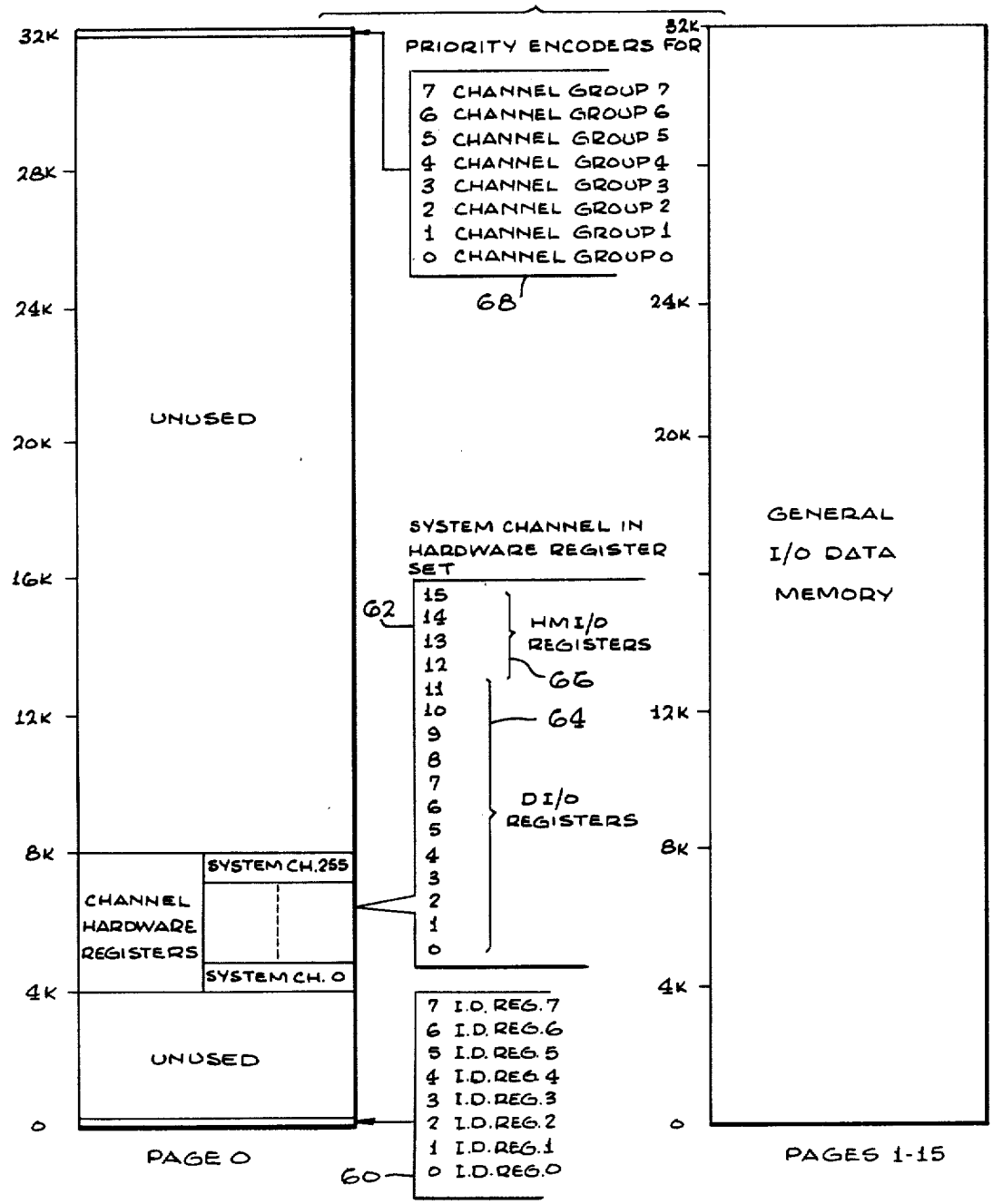
FIG. 4 is a diagrammatic representation of hardware register partitioning within the information exchange processor.

The master bus input/output memory address space is partitioned as shown in FIG. 4. This address space is subdivided into sixteen pages of 32,768 words each. Pages one through fifteen may be used by the input/output units as data memory. Page zero contains hardware input/output registers and certain input/output system control registers. The registers contained in page zero are described below.

Microprocessor ID registers 60 occupy the first eight locations of page zero. Each microprocessor contains one four-bit ID register which is loaded by the host computer. The number loaded into the ID register uniquely identifies the specific microprocessor, specifies the two pages which are to serve as the microprocessor local memory, defines the system channels which the microprocessor is to service, and establishes the microprocessor as either a master microprocessor or a slave microprocessor as will be explained below. The master bus address of the microprocessor's ID register 60 could be determined by a card slot position in which the microprocessor is installed. Or as an option, the ID number of a specific microprocessor could be permanently established by a rotary switch installed on the microprocessor's circuit board in place of the ID register as previously explained. Alternatively, the microprocessor's ID register could be loaded under program control.

Channel hardware registers 62 occupy the second 4096 words of I/O memory address space. Sixteen hardware register addresses are assigned to each of the 256 system channels as previously defined. The first twelve registers of a channel are assigned to a device input/output unit port to be explained below. The remaining four registers are assigned to one of the host memory input/output units. The device input/output registers 64 are used to hold output data (or input data) device status, device commands, port mode control data, etc. The host memory input/output unit registers 66 hold the host computer memory bus address, word count, command/status, and data. The channel hardware registers have the same address partitioning structure and occupy the same relative position in input/output memory address spaced as do the memory registers in the processor memory address space.

The device input/output group priority request encoders are located in the top eight address locations of page 0 as shown at 68. Each device input/output unit contains one group priority request encoder which is read by a microprocessor to determine which of the device input/output ports caused the device input/output unit to activate its interrupt request line as will be explained below. A priority encoder generates a master bus 26 interrupt at a level corresponding to its device input/output group number whenever one of its physical channels requires service. The interrupt level is used by the interrupted microprocessor to form the address required to read the interrupting priority encoder. The word read from the priority encoder will be described below. This word is in effect a memory register address which is used by an interrupted microprocessor to fetch the full system channel address of the interrupting channel. A priority encoder can only supply physical channel address information since it does not know which of the host computers is using its channels.

Figure 5:
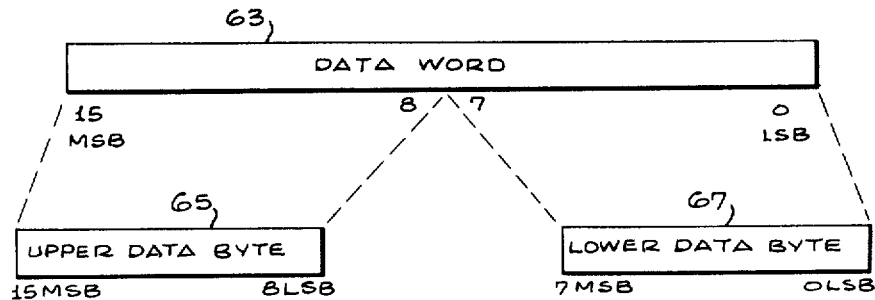
FIG. 5 is a diagrammatic representation of a data word used by an information exchange processor.

In order to understand operation of the master bus 26 it is necessary to understand how data words and address words are developed in the information exchange processor. Data is transferred along the master bus 26 in either direction as a sixteen-bit word 63 on data lines zero through fifteen to be explained below. Data line zero is the least significant bit of the data word and data line fifteen is the most significant bit. FIG. 5 shows the format of a master bus 26 data word. Each data word may be composed of first and second eight-bit data bytes, 65 and 67 respectively. Data lines zero through seven carry the lower data byte and data lines eight through fifteen carry the upper data byte. Data lines zero and eight carry the least significant bits of the two bytes while data lines seven and fifteen carry the most significant bits.

A total of 1,048,576 memory words may be directly accessed by the master bus 26. This memory space is divided into two equal parts. The lower half as previously explained is called processor memory space, and the upper half input/output memory space. A microprocessor can address all of the processor memory space and certain of the input/output registers located in page zero of the input/output memory space. The master bus 26 address format is shown in FIG. 6A at 70. Bit twenty indicates the memory space to which the address applies. Processor memory space is specified if bit twenty is zero, and input/output memory space is specified if bit twenty is one. Bits sixteen through nineteen specify one of sixteen pages of memory. Bits one through fifteen specify one of 32,768 words contained in the selected page. Bit zero selects one of the two eight-bit bytes of a data word shown in FIG. 5. The master bus 26 is chosen so that either byte or word data may be sent through it. A master bus 26 byte control line, to be explained below, specifies the type of data being transferred. If the byte control line is activated during a write transfer, the addressed memory cell or hardware register will accept only that portion of the master bus data lines specified by address bit zero which identifies whether a lower or upper portion of the byte is to be operative as previously explained. The opposite byte of the addressed memory cell or hardware register will be unaffected by the operation. An addressed memory cell or hardware register will supply a sixteen-bit data word to the master bus 26 during a read operation in which the byte control line is active. However, only data in the byte specified by address bit zero is guaranteed to be valid. The other byte of the addressed word may or may not be valid. All sixteen master bus data bits are written into the addressed location when the byte control line is inactive regardless of address bit zero. In addition, all sixteen bits read from an addressed location are considered valid when the byte control line is inactive. As can be readily appreciated by those familiar with the information processing art, many other different word combinations and coding techniques could be utilized, and the technique being described is only an exemplary embodiment of one found to be useful in the information exchange processor being described.

A system channel address structure shown in FIG. 6B is used within the information exchange processor to interconnect each host memory input/output device access port with all sixty-four of the simplex channels previously described. The system channel address identifies a data path, called a system channel or channel, through the information exchange processor from the host memory access port to the particular input/output device port. The direction of data that flow through a channel is determined by hardware in the device port to be explained below. If the channel is servicing a device output port (input and output is chosen to be with respect to the information exchange processor) then data will flow from the host memory port to the device port. The data will flow in the opposite direction if the channel is servicing a device input port. A system channel address 74 identifies the two ports which that channel is interconnecting. The first portion of the address identifies the host memory input/output unit port as shown at 76. This portion of the system channel address is provided by the host memory input/output unit in response to a host computer requesting that a channel be established between it and one of the device input/output unit ports. Thus, the host computer itself does not identify or know which microprocessor is servicing its request. Nor does the host computer identify itself nor know how many other host computers are being serviced by the IEP. The host computer is identified by its corresponding host memory input/output unit and the specific microprocessor is identified by the information contained in the memory registers 50 as previously explained. The second portion of the address, which includes bits zero through five, identifies the specific information channel to be serviced. This address portion 78 is partitioned into a group address which identifies the specific device input/output unit and a subgroup address 80 which identifies a specific information channel to be addressed within that device input/output unit.

The system channels are not all active at the same time. A device input/output information channel port will normally exchange data with only one host memory input/output unit port at a time. This exchange will utilize one of the four system channels associated with that particular information port. The three remaining system channels, which are associated with the other three host memory input/output units will be inactive. Hovever, a host memory input/output unit port may be simultaneously communicating with several device input/output unit ports.

As previously explained, one device input/output port may send data to a second device input/output port via a virtual host memory port. A virtual host memory port is one that only appears to exist. In this type of data exchange, each device input/output port believes that it is exchanging data with a host memory port. In fact an information exchange processor routing program will accept data from one of the device input/output ports and reroute it to the other selected device input/output port. It is anticipated that use of a device input/output port to device input/output port data channel will be a predominate usage of the information exchange processor provided by the invention.

A memory register 50 address is shown at 82 in FIG. 6C. It includes a system channel address as shown in FIG. 6B which utilizes bits five through twelve and provides the capability to address the 256 system channels as previously explained. Bits one through four as shown at 84 are used for addressing the proper register 52 within the system channel. A channel register 62 address is shown in FIG. 6D and consists of bits five through twelve for addressing each of the 256 possible channels. Bit twenty is shown as an one to indicate addressing of a hardware register. A priority encoder address is shown in FIG. 6E and provides bits one through three for addressing each of the eight possible priority groups 68 shown in FIG. 4. A priority encoder vector shown in FIG. 6F specifies the interrupting simplex channel in bits five through ten.

Figure 7:
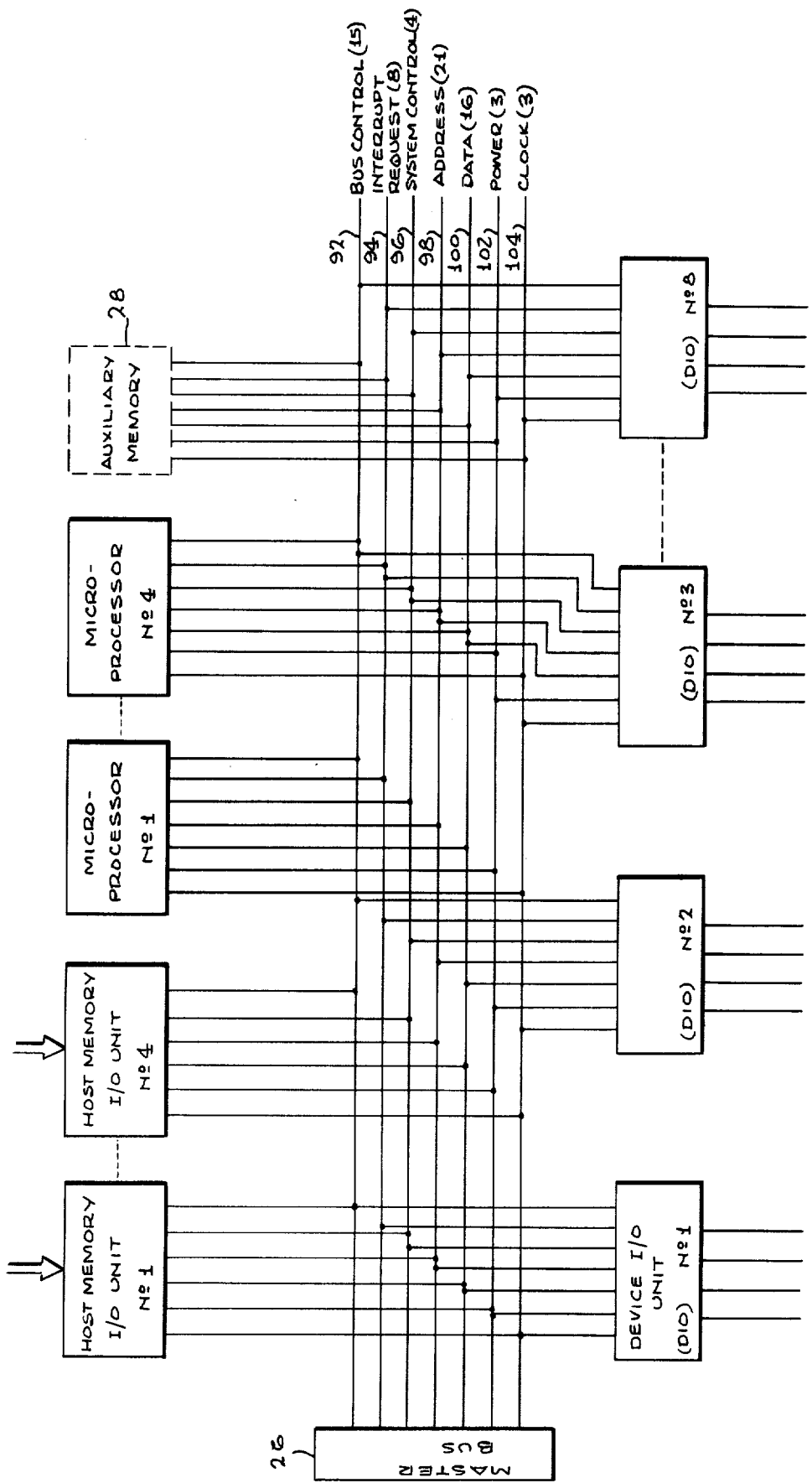
FIG. 7 is a schematic representation of the master bus and its interface with other units of the information exchange processor which can be figured as a master or as a slave as shown in FIG. 9.

The master bus 26, as previously explained, interconnects the four host memory input/output units H1–H4, the eight device input/output units D–D8, the four microprocessors P1–P4 and the auxilliary memory 28. Referring to FIG. 7, the lines effecting this interconnection can be seen. The master bus 26 has lines dedicated to bus control 92, interrupt request 94, system control 96, address 98, data 100, power 102, and clock signals 104. As will be explained below, all the devices connected to the master bus 26 are classified as either master devices or slave devices. Slave devices include the eight device input/output units D1–D8, these devices responding to signals provided by the master devices. The auxilliary memory 28 is a slave device which responds only when addressed. The four host memory input/output units H1–H4 and the four microprocessors P1–P4 are all master devices. A master device may contend for and acquire control of the master bus 26 whenever it needs to transfer data and/or control information to or from another device on the bus. A master device may also generate interrupts. Slave devices never contend for the bus. Instead, they respond to data movement commands of the master devices. A slave device will either provide data to or from a master device via the master bus 26 when addressed. Although the device input/output units D1–D8 are slave devices, they can generate interrupt signals. They are thus designated as active slave devices. The auxilliary memory 28 does not generate interrupt signals and is thus designated as a passive slave device. Acquisition of the master bus 26 by a master device could be effected in many ways known to those familiar with the digital computer arts.

In the exemplary embodiment, signals and associated signal mnemonics are shown in Table 1.

TABLE 1

| SIGNAL FUNCTION | SIGNAL MNEMONIC |
| --- | --- |
| Master Clock | BMCK* |
| Bus Clock | BBCK* |
| System Clock | BSCK* |
| Master Bus Address | BA00–BA20 |
| Master Bus Data (Low Byte 00–07, High Byte 08–15) | BD00–BD15 |
| Master Bus Request | BREQ* |
| Master Sequence Out | BSEQ* |
| Sequence Line 0 | BSEQ0* |
| Sequence Line 1 | BSEQ1* |
| Sequence Line 2 | BSEQ2* |
| Sequence Line 3 | BSEQ3* |
| Sequence Line 4 | BSEQ4* |
| Sequence Line 5 | BSEQ5* |
| Sequence Line 6 | BSEQ6* |
| Sequence Line 7 | BSEQ7* |
| Device Sequence Code | BSEQSA* |
| Device Sequence Code | BSEQSB* |
| Device Sequence Code | BSEQSC* |
| Data Amp Enable | BDAE* |
| Read or Write | BRW |
| Slave Wait | BWAIT* |
| Operate on Byte Only (BA00 identifies byte) | BBYTE* |
| Interrupt Request 0 | BIRQ0* |
| Interrupt Request 1 | BIRQ1* |
| Interrupt Request 2 | BIRQ2* |
| Interrupt Request 3 | BIRQ3* |
| Interrupt Request 4 | BIRQ4* |
| Interrupt Request 5 | BIRQ5* |
| Interrupt Request 6 | BIRQ6* |
| Interrupt Request 7 | BIRQ7* |
| Device Initialize | BINIT* |
| Device Request | BRESET* |
| Load Computer ID Reg. | BLDID* |
| Master Microprocessor Permits Slave Microprocessor to Run | BRUN* |

Some of the control signals of Table 1 required to effect data transfers are described below.

Bus Request:

Activated by any master device wishing to gain control of the master bus in order to transfer a data word.

Bus Sequence Lines:

A set of nine lines used for bus request arbitration. A device with the highest numbered bus sequence line activated is allowed to use the master bus 26 during the next bus cycle.

Master Bus Data Amplifier Enable:

Enables read data onto the master bus.

Master Bus Read or Write:

This signal is activated for a transfer in which data is to be written into an addressed master bus location.

WAIT:

Signal activated by the addressed bus device if it cannot accept or fetch data in a normally allowed time interval.

Byte Transfer:

Indicates that a byte of information is being transfered instead of a word.

The eight interrupt lines shown in Table 1 are utilized as follows. A device input/output unit generates an interrupt by activating the interrupt line corresponding to its group address number as shown in FIG. 6B. The microprocessor assigned to that channel group will be interrupted if it is operating at a priority level lower than that of the interrupting device input/output unit. The microprocessor responds to the interrupt by reading the device input/output unit's priority encoder after deriving the master bus address of the encoder from the interrupt request signal. The word read from the priority encoder vectors the microprocessor to a set of memory registers reserved for that device port. For example, if a first device port is interrupting, then the microprocessor will be vectored to the set of memory registers corresponding to that system channel, thereby finding the program entry point for the interrupting channel. The device input/output unit will release its interrupt request line after the status register corresponding to the interrupting port has been read if none of its other ports are requesting service. If there are other ports requesting service, the device input/output unit will maintain its interrupt request line active until all of its requesting ports have been serviced. However, the microprocessor will not service the next device input/output unit port until service of that the previous is complete. Only when servicing of that port is complete, thereby resulting in the microprocessor returning to its previous lower priority level, will it see the new interrupt from the device input/output unit.

Referring again to Table 1, a typical sequence using the signals shown therein would be as follows. A master device request for use of the master bus is initiated by pulling down the bus request line (BREQ*) and activating the bus sequence out line (BSEQ*). At the end of every bus cycle (BDAE* deactivated) each master device waiting to use the bus will examine the sequence line to determine if a sequence line of higher priority than its own is activated. If the device finds no other higher sequence line, it will use the next bus cycle. Once acquiring the master bus 26, a device cannot again ask for the bus until all other devices requesting the bus have had an opportunity to make use of it as previously explained. That is, a device must not request the master bus again until the master bus sequence out line (BSEQ*) is inactive. This procedure insures that all master devices have equal opportunity to use the bus. All master devices are assumed to have equal priority; however, the priority assigned to a sequence line determines which master device is to use the bus first when multiple requests are pending. Again, the above explanation relates to a specific implementation and many other implementations will be immediately suggested to those familiar with the processor control art.

Figure 8:
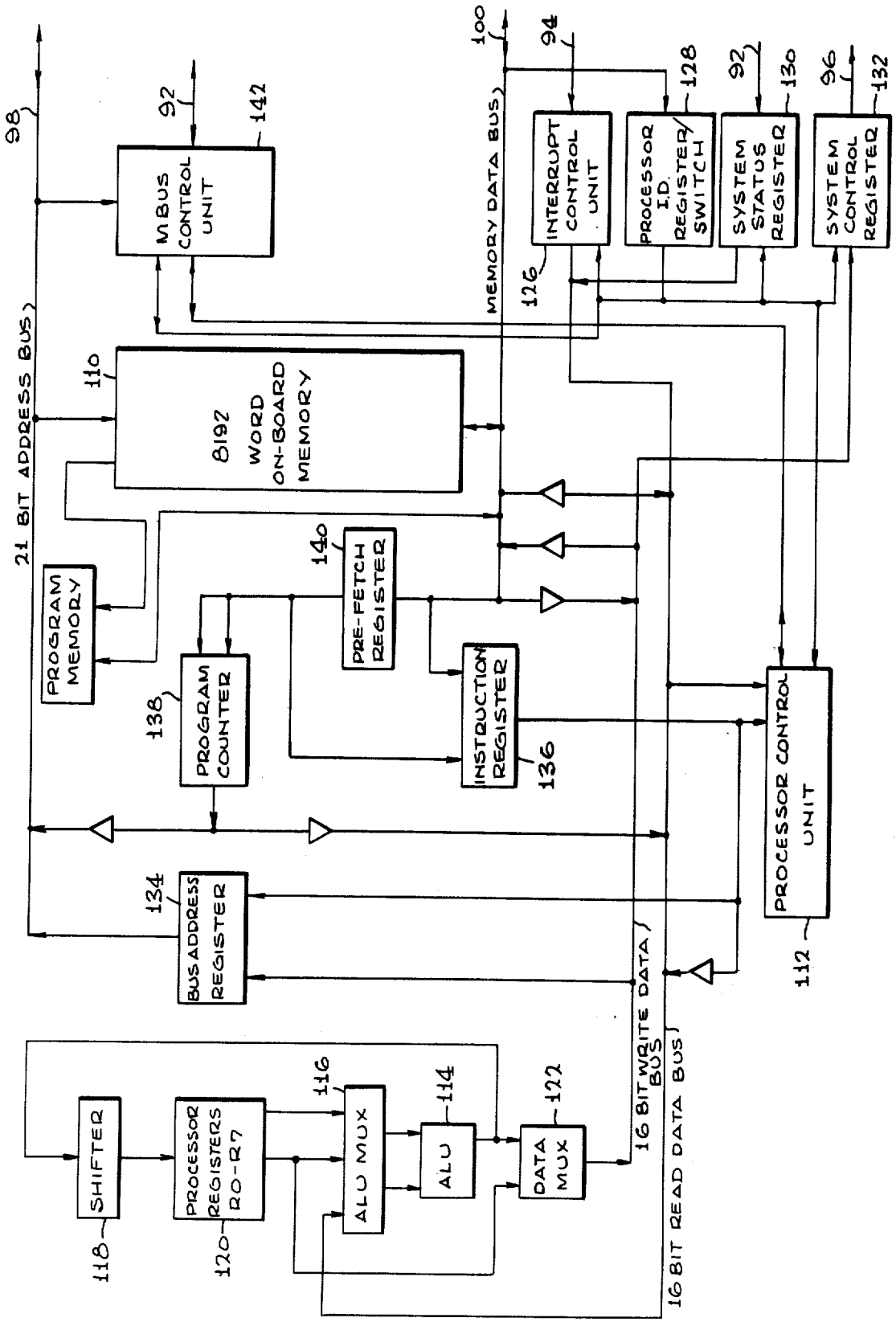
FIG. 8 is a block diagram of the microprocessor.

A block diagram of one of the microprocessors is shown in FIG. 8. As previously explained, the microprocessor contains an 8192 word on-board memory 110 which, in conjunction with the program memories shown in FIG. 3, comprises the local memory of the microprocessor. Inputs to the microprocessor are received by the twenty-one address lines 98 (BA00-BA20) from the master bus 26, and control signals from the bus control lines 92. Interrupt signals are received via the interrupt request lines 94 (BIRQ0*-BIRQ7*) and data is received on data lines 100 (BD00-BD15). System status and system control signals are also provided. Information on the data lines 100 is provided to a processor control input 112 which contains status conditions generated by the last arithmetic, logic or compare instructions as well as containing the processor interrupt level previously explained. A status portion (not shown) of the processor control unit 112 is automatically updated at the end of any arithmetic, logic or compare instruction and remains valid until another arithmetic, logic or compare function is performed by the microprocessor. A priority level section of the processor control unit 112 determines those internal devices connected to the master bus 26 which may interrupt the particular microprocessor. An external device can interrupt the microprocessor only if its priority level is higher than the priority level stored in the microprocessor control unit 112.

Arithmetic and logic computations are effected in the microprocessor by an arithmetic and logic unit (ALU) 114 which receives operands via an arithmetic and logic unit multiplexer 116. Calculation results from the arithmetic and logic unit 114 may be passed through a shifter 118 which shifts data right or left if required and stored in one of eight processor registers 120. Alternately data may be routed from either the ALU 114 or one of the eight processor registers 120 to a data multiplexer 122 which in turn provides data to both the data lines 100 and other registers throughout the microprocessor.

An interrupt control unit 126 is provided to receive interrupt signals from the interrupt request lines 94 on the master bus 26. The interrupt control unit 126 provides the priority encoder address to the bus address register 134 via the arithmetic and logic unit multiplexer 116, ALU 114 and data MUX 122 when an interrupt signal of higher priority than that stored within the processor control unit 112 is received. Three microprocessor control registers are provided to aid in configuring the information exchange processor for each particular application. These registers are a processor ID register 128, a systems status register 130 and a system control register 132. The processor ID register 128 is a four bit control register which specifies the output channels to be serviced by the microprocessor, which memory page the on-board memory is assigned to, and whether it is a master or slave microprocessor as will be explained below. The processor ID registor provides control signals to the interrupt control unit 126, the system status register 130, the system control register 132 and an MBUS control unit 142. As previously explained, the processor ID register can be loaded from one of the host computers, or it can be configured according to a rotary switch provided on the microprocessor itself. The systems status register 130 is a sixteen bit register used by the microprocessor application programs to read the microprocessor ID register 128 and various master bus 26 control signal inputs on the bus control lines 92. A bus address register 134 receives inputs from both the processor control unit 112 and the data multiplexer 122. The bus address register 134 is used by the microprocessor control logic to address output channels, memory registers and other memory data referenced by program instructions. The bus address register 134 forms channel memory and device I/O register addresses by combining data received from an instruction register 136 and other inputs as previously explained. Address information developed by the bus address register 134 is in accordance with the address formats described in conjunction with FIG. 6. A program counter 138 is used by the microprocessor control logic to address program instructions and data words immediately following an instruction. The program counter 138 contains both page and word information. A word address portion of the program counter 138 is incremented after each instruction so that the counter will be addressing the next following word during execution of an instruction. The following word may be either immediate data to be operated on by the instruction or the next instruction to be executed. If the word is immediate data, then the program counter 138 will be incremented again after that data is used. As a result, the next instruction word is always addressed and ready for loading into the microprocessor instruction register 136 when execution of the present instruction is complete. In some cases, the next instruction word will actually be fetched from memory while the present instruction is still being executed. Overlapping instruction fetches of this type are used to increase processing speed and are performed whenever immediate data does not follow the present instruction. This function is accomplished by a prefetch register 140 in which a prefetch instruction is temporarily stored while the present instruction is being executed. A prefetched instruction will be loaded into the instruction register 136 as the last step of the present instruction is being performed. The master bus control unit 142 is provided to control the interface between the processor control unit 112 and the master bus 26. It should be noted that the specific implementation of the microprocessor or its specific method of operation is not critical to the teachings of the invention, and many other types of microprocessors could be utilized.

Figure 9:
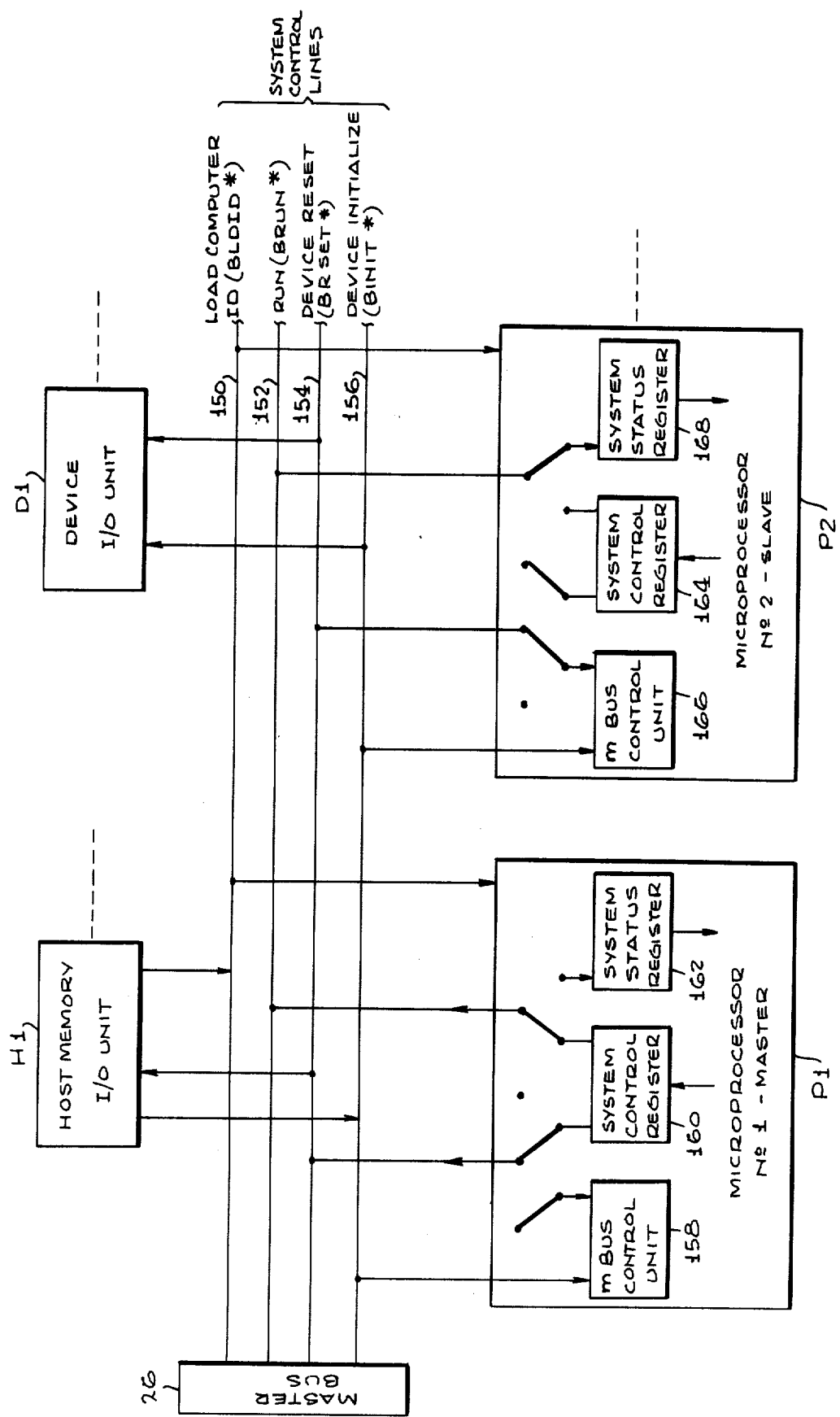
FIG. 9 is a block diagram showing a master microprocessor, a slave microprocessor, and their interfaces with the master bus.

Referring now to FIG. 9, the interfaces between the first microprocessor P1, which is designated as a master microprocessor, the second microprocessor P2 and subsequent microprocessors which are designated as slave microprocessors with respect to the master microprocessor, and the master bus 26 are shown. The distinction between master and slave microprocessor is significant only during initialization activities. Four of the system control lines designated as load computer ID (BLDID*) 150, run (BRUN*) 152, device reset (BRSET*) 154, and device initialize (BINIT*) 156 listed in Table 1 are shown. Referring to the master microprocessor P1, it can be seen that a master bus control unit 158 connects directly to the device initialize line 156 and a system control register 160 connects directly to the run line 152 and the device reset line 154. Thus, control signals from the host memory input/output unit H1 can interfere directly with the master microprocessor P1 master bus control unit 158 and through the system control register 160 back to the run and device reset lines 152 and 154, respectively. Signals on these lines in turn control the slave microprocessor P2. Referring now to the second microprocessor P2 shown in FIG. 9, its system control register 164 does not interface with the master bus 26. However, a master bus control unit 166 receives device reset and device initialize signals on lines 154 and 156, respectively. As one can appreciate, input signals to the slave microprocessor's master bus control unit 166 are provided by the system control register 160 of the master microprocessor P1. Thus, the master processor P1, through its system control register 160, controls the slave microprocessor P2 through its master bus control unit 166. Run commands for the slave microprocessor are likewise controlled by the master microprocessor P1 through its system control register 160 and received by a system status register 168 in the slave microprocessor P2. Signals on the device initialize line 156, generated by a host memory input/output unit in response to a signal for the associated host computer, reset the master microprocessor P1 which in turn resets the other microprocessors, device input/output units and host memory input/output units.

A typical device input/output unit is shown in FIG. 10, the unit illustrating two types of data ports which can be provided, a high speed port 180 and a low speed port 182. The high speed port is chosen to operate with a full duplex communication channel which permits the high speed port to transmit and receive data simultaneously. Bit parallel data is fetched from the master bus 26 by the high speed port, converted to a bit serial format, and transmitted into the channel at a bit rate which is conventionally specified by the channel. The high speed port will generate its own transmit clock if one is not provided by the channel. Similarly, data is received from the communication channel in a bit serial format, at a rate always specified by the channel, converted into a bit parallel format by the high speed port, and presented to the master bus 26. Data framing and error control procedures, required to successfully transfer data through the communications channel, are performed jointly by the high speed port and the microprocessor previously described. The low speed port interfaces to a low speed, full duplex communication channel. The low speed port is designed primarily to interface with an asynchronous terminal. The low speed port is generally operated at standard data rates from fifty bits per second to 19,200 bits per second.

Referring now to FIG. 11, the various elements included in the high speed port 182 are shown. A master bus control register 190 interconnects with a register bus 192 and controls the transfer of data between the high speed port 182 and the master bus 26. A transmit command register 194 is chosen as an eight-bit register utilized by the information exchange processor software for issuing transfer commands. A transmit status register 196 is chosen to be a sixteen bit register that presents transmission status to the master bus 26. The microprocessor normally reads the transmit status register 196 only in response to a microprocessor interrupt generated by the high speed port, or when in the process of originating a call to automatic dialing equipment (not shown). The transmit status register 196 defines the status of an in-process data transfer. Each of the register locations corresponds to a specific transmission parameter. An example of the type of information contained in the transmit status register 196 includes a scheduled data request, which, when set, indicates that the high speed port is interrupting the microprocessor to request additional transmit memory access parameters. Further examples include a memory read error bit which, when set, indicates that the microprocessor is being interrupted to report that the high speed port encountered a memory read error while fetching a word for transmission from memory. A data under-run error bit, when set, indicates that the microprocessor is being interrupted to report that a frame ran out of data during transmission. A parameter first-in, first-out (FIFO) under-run error bit, when set, indicates that a microprocessor is being interrupted to report that additional data transfer parameters were not provided when required. A data mode bit indicates that a channel connection exists and a channel is available for transfer of data. A clear-to-send bit presents status of a communication channel clear-to-send signal. An incoming call bit presents the status of the communication channel incoming call signal. Other bits correspond to data line occupied, and abandon call and retry. These bits are somewhat arbitrary and many different types of control bits will be immediately suggested to those familiar with data transmission and reception systems.

A transmitter header page register 198 is an eight-bit register which identifies the page number containing the transmitted information. A transmit direct memory access (DMA) parameter FIFO register 200 is a sixteen-bit, first-in, first-out buffer that holds the master bus 26 DMA transfer parameters for up to ten transmitted frames. The transmit data FIFO register 202 is a thirty-two byte elastic buffer which accepts bursts of transmit data from the master bus 26 and delivers this data to a transmit register 202 through a loading multiplexer 204. A receive command register 206 is an eight-bit register for issuing receive commands to the high speed port. This register has bits corresponding to receive, enable, and terminal ready. A receive status register 208 is an eight-bit register used to present receive status to the master bus 26. It includes bits corresponding to frame good, frame error, sync loss, receive overrun error, and channel loss. Four receive direct memory access parameters are provided, the four being a receive header page register 210, a receive header starting address register 212, a receive information page address register 214 and a receive information start address register 216. Receive frame buffers 218 are provided to temporarily store received data and to present the received data to the master bus 26. In addition, a transmit frame length register 220, a receive frame length register 222, and an information field length register 224 are also provided. A sync generator 230 is provided to produce a twenty-four bit synchronization sequence which is automatically transmitted by the high speed port once every frame, this transmission being controlled by the load multiplexer 204. A null generator 232 is provided which produces null characters used by the high speed port to automatically fill out each transmit frame in which the header and other information totals less than a predetermined number of bytes. The load multiplexer 204, as previously explained, selects the sync generator 230, null generator 232 or the transmit data FIFO register 202 for source data as required. The transmit register 203 accepts bit parallel data from the load multiplexer 204 and shifts this data, low order bit first, out to the channel as a bit serial data stream at the prescribed data rate.

A CRC generator 236 produces a thirty-two bit CRC frame check sequence. This sequence is generated at the first bit of a frame header and ends after including the last bit of an information field. A transmit multiplexer 238 selects either the output of the transmit register 203 or the CRC generator 236 as a source of the bit serial data stream being transmitted. An internal clock 240 provides the high speed port with a transmit data clock if a transmit data clock is not provided by the channel. A channel interface unit 242 contains line drivers, receivers and padding networks required to interface channel data and control signals. A receive multiplexer 244 selects either a channel receive line 246 or the transmit multiplexer 238 as the high speed port input data stream. The transmit multiplexer 238 is normally selected during a self-test mode to loop the transmitter output back to the receiver input. A sync detector 248 recognizes a twenty-four bit sync sequence occuring at the beginning of each frame. A CRC check circuit 250 calculates a frame CRC check sequence. All bits in the header and information fields of a frame are included in the calculation. The results of the calculations are compared against a CRC check sequence immediately following the information field to determine if a frame error has occurred. A receive register 252 assembles the incoming receive bit stream into eight-bit data bytes once frame bit synchronization has occurred. As each receive data byte is assembled, it is loaded directly into the receive frame buffer 218. The high speed port control section 256 coordinates operation of this portion of the device input/output unit. The transmit frame length register 220 is loaded during channel initialization, with the transmit frame parameter defining the length of all frames which the transmitter is to send. The receive frame length register 222 is also loaded during channel initialization, and defines the length of all frames to be received. The information field length register 224 defines the length of the information fields transmitted and received by the unit.

Referring now to FIG. 12, a block diagram of the low speed port 180 is shown. A first mode register 260 is an eight-bit register loaded by the master bus 26 to establish the mode of operation for the low speed port 180. Information contained within the first mode register 26 includes character length, parity enable, parity type, and the number of stop bits. A second mode register 262 is also an eight-bit register which specifies the low speed port 180 data rate. In the exemplary embodiment sixteen data rates are provided. A command register 264 is an eight-bit register which is used for issuing commands to the low speed port. Such commands include transmit enable, terminal ready, receive enable, break enable, error reset, as well as defining an operating mode. An eight-bit status register 266 is used by the port to present status information to the master bus 26. Typical status signals include transmit ready, receive ready, parity error, overrun error, and frame error. A transmit holding register 268 is utilized for holding a data character to be transmitted by the low speed port. It is interconnected to a transmit register 270 which reads the characters contained in the transmit holding register 268, and calculates parity for each character and transmits the characters to the channel via a channel interface 272. The channel interface 272 contains amplifiers and receivers for the four interface signal lines shown in FIG. 10, these lines including send data, receive data, terminal ready and data mode. A BAUD rate clock 274 generates the transmit and receive data clock signals required by the low speed port. A receive multiplexer 276 assembles the bit serial data stream from the channel interface 272 into receive characters. As in the high speed port, the receive multiplexer 278 can be configured in a self-test mode so that the output from the transmit register 270 is provided directly to a receive register 278. A receive holding register 280 contains the last received data character assembled by the receive register 278. If the character length specified by the first mode register 260 is less than eight-bits, the higher order unused bits in the receive holding register 280 are set to zero. A master bus control register 282 coordinates the transfer of data between a low speed port control unit 284 and the master bus 26. In addition, the low speed port control unit 284 coordinates operation of the low speed port.

Figure 13:
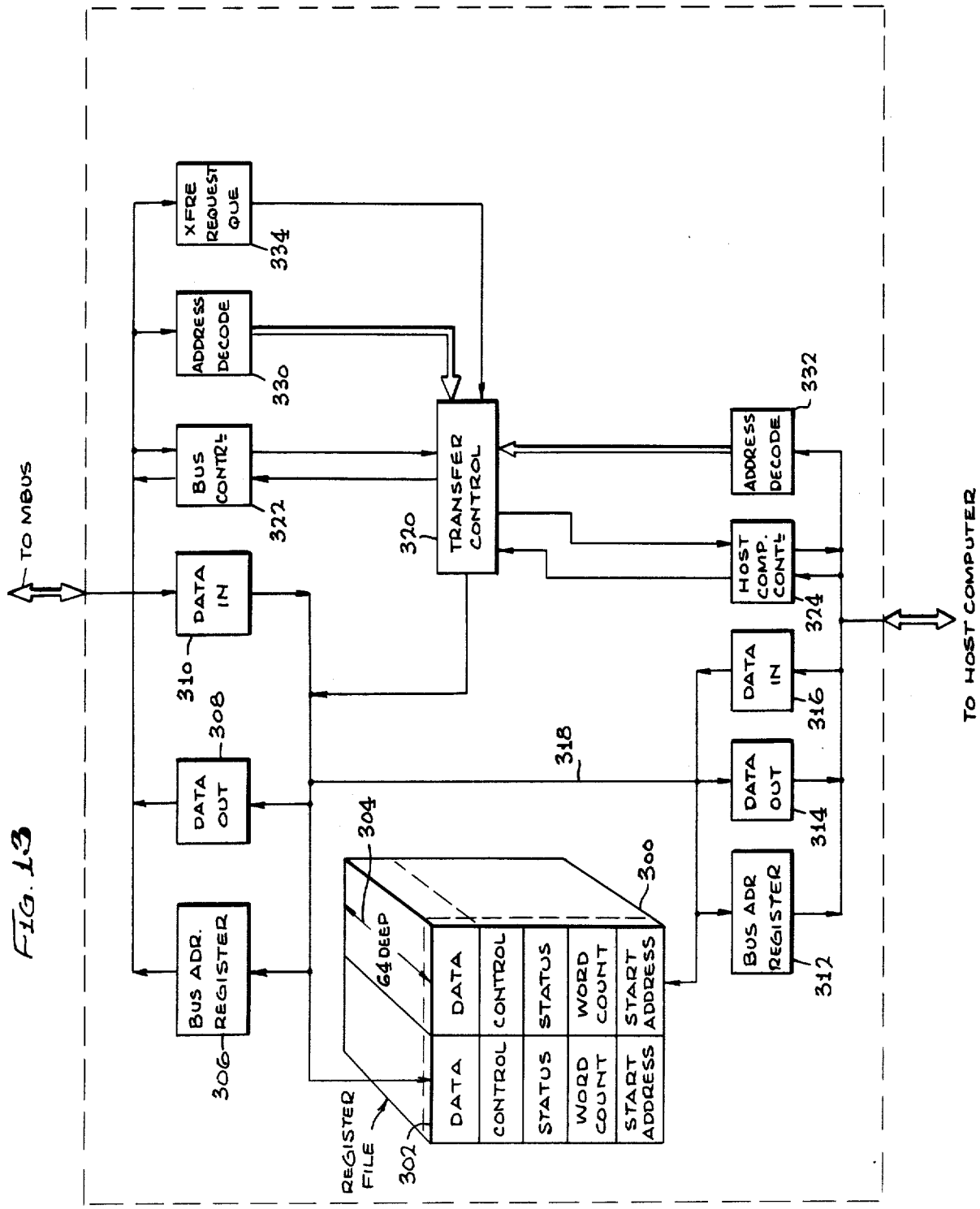
FIG. 13 is a block diagram of the host memory input/output unit.

A block diagram of one of the host memory input/output units is shown in FIG. 13. Two register files are provided, a host computer input register file 300 and a master bus input register file 302. These register files are sixty-four layers deep as shown at 304, one layer corresponding to each of the sixty-four simplex lines previously described. The register files contain data, control, status, word count, and start address information related to the transfer of data between a host computer and the master bus. In addition, the host memory input/output unit contains a plurality of registers connected to the master bus. These include a bus address register 306, which contains address information specifying where data is to be routed, a data out register 308 through which information from the master bus register file 302 passes. A data input register 310 is also provided for interfacing the master bus 26 and the master bus register file 302. In a corresponding manner, a bus address register 312, a data output register 314 and a data input register 316 are provided to interface the host computer with the computer input register file 300. For direct linkage between the host computer and the master bus 26, a by-pass line 318 is provided, this line allowing direct access without interfacing through the two register files 300 and 302. Transfer control between the master bus 26 and the host computer is effected via a transfer control unit 320 which in turn receives information through a bus control register 322 connected to the master bus, and a host computer control register 324 connected to the host computer. A master bus address decode register 330 and a host computer decode register 332 are provided, the decode registers providing address information to the transfer control unit 320. A transfer request que register 334 is also provided, this register providing an input signal to the transfer control unit 320 to effect transfers of data blocks requested by the microprocessors on a first come, first serve basis.

In accordance with a further embodiment of the invention shown in FIG. 14, two information exchange processors 360 and 362 are connected in parallel a plurality of host computers and to a plurality of device input/output channels. Thus a failure in one information processor would result in the other information exchange processor assuming the entire load without having to overburden any of the host computers.

The information exchange processor provided by the invention can be modularized so that each functional element can be packaged in a single module or on a single card adapted to interface with a mother board containing the master bus. The function elements include the host memory, I/O units, microprocessors 364, auxilary memory 365, and device input/output units 366. Referring to FIG. 15, a mother board 370 containing a master bus 372 is provided. The mother board has a plurality of recepticals or card slots housing terminals (not shown) connected to the master bus. The card slots are configured to receive printed circuit boards configured as host memory I/O units 363, 374, microprocessors 376, auxilary memories 378, and device I/O units 380. The host memory I/O unit card slots 374 are connected to the host computers via a computer bus 382, and the device I/O unit card slots 380 are connected to the I/O device via a device bus 384. Any number of card slots can be provided so that the member of each type of functional element can be increased. In a similar manner, each printed circuit board could contain a plurality of functional element schedules so that each board added would increase the functional elements by a predetermined multiple.

From the foregoing, it should now be apparent that a versatile information exchange processor has been disclosed which is capable of servicing a plurality of peripheral devices which can each utilize a different communication discipline. This servicing is possible by the use of a master bus in which a plurality of host memory input/output units, microprocessors, auxiliary memory, and device input/output units are connected. Through the host memory input/output units, a plurality of host computers can effect direct memory access transfers from the host computer main memory to a peripheral device, or can cause two peripheral devices to be interconnected through associated device input/output units. Depending on the particular communication desired, the microprocessors can through their own on-board memories and through an auxiliary memory accommodate different communication disciplines, and control a wide variety of data transfer and control operations. Thus, a high degree of versatility is provided which allows direct access to a plurality of computers for control of a plurality of different communication channels.

What is claimed is:

1. In a data processing system having one or more host computers, each host computer having a central processing unit and an associated main memory, and a plurality of peripheral devices, each of said peripheral devices intended to communicate with one or more of said host computers or with one or more other peripheral devices, the improvement comprising an information exchange processor for responding to an input message from each host computer or each peripheral device via a shared or individual channel in accordance with a communication discipline defined for that channel, and for supplying a corresponding output message to one of said host computers or one of said peripheral devices on that or another channel in accordance with a communication discipline defined for that channel, said information exchange processor including:

a bus;

a host computer input/output channel;

at least one host memory input/output unit coupled to said bus for receiving data from or transmitting data to a host computer via said host computer input/output channel;

a plurality of device input/output channels;

a plurality of device input/output units coupled to said bus, each for communicating data from or to said peripheral devices via at least one of said device input/output channels; and control means coupled to said bus and responsive to data supplied from said at least one host memory input/output unit or device input/output units for providing data to any one of said channels in accordance with a communication discipline defined for that channel and, said control means comprising at least one processor, connected to said bus, having means for identifying device input/output units indicated to said processor, said processor performing said providing operation and controlling data flow between said at least one host memory input/out unit and said one or more dedicated device input/output units, or between said one or more dedicated device input/output units.

2. The information exchange processor of claim 1 wherein said at least one host memory input/output unit comprises multiple host memory input/output units.

3. The information exchange processor of claim 1 where at least said one processor comprises two or more processors, said processors having means for identifying predetermined device input/output units dedicated to respective ones of said processors, and said processors being programmed to control data flow to its dedicated device input/output unit in response to requests from any of said one or more host memory input/output units, or from another device input/output unit.

4. The information exchange processor of claim 1 wherein said means for identifying includes means responsive to data supplied from said at least one host memory input/output unit or device input/output units for identifying from said input/output channels selected channels for the provision of data between said at least one host memory input/output unit and said device input/output units or between said device input/output units.

5. The information exchange processor of claim 4 wherein said host memory input/output units or said device input/output units supply addressing information defining selected channels from said input/output channels, said means for identifying including register means responsive to said addressing information.

6. The information exchange processor of claim 1, wherein said control means comprises a plurality of processors each of which is connected to said bus, each of said processors including register means for identifying selected channels from said input/output channels;
   means for adding processors to said bus responsive to an increased number of input/output channels and for decreasing said processors connected to said bus responsive to a decreased number of said input/output channels.

7. A data processing system comprising:
   one or more host computers each of which comprises a central processing unit and an associated main memory;
   a plurality of peripheral devices each of which is intended to communicate with one or more other peripheral devices,
   a first information exchange processor for responding to an input message from each host computer or each peripheral device via a shared or individual channel in accordance with a communication discipline defined for that channel, and for supplying a corresponding output message to one of said host computers or one of said peripheral devices on that or another channel in accordance with a communication discipline defined for that channel, said first information exchange processor including:
   a bus;
   at least one host memory input/output unit coupled to said bus for receiving data from or transmitting data to a host computer via a host computer input/output channel;
   a plurality of device input/output units coupled to said bus, each for receiving data from or transmitting data to said peripheral devices via device input/output channels; and
   control means coupled to said bus and responsive to data supplied from any of said host memory input/output units or device input/output units for providing data to any of said channels in accordance with a communication discipline defined for that channel, and
   said control means comprising at least one processor connected to said bus, having means for identifying predetermined device input/output units dedicated to said processor and said processor having a stored program for performing said providing operation and controlling data flow between said at least one host memory input/output unit and said one or more dedicated input/output units or between said one or more dedicated input/output units.

8. The data processing system of claim 7 wherein said means for identifying includes register means for identifying selected channels for the providing of data between said at least one host memory input/out unit and said one or more device input/output units or between said one or more device input/output units.

* * * * *